April 21, 1953     H. A. WILHELM ET AL     2,635,956
PREPARATION OF POWDERED THORIUM
Filed Jan. 27, 1950
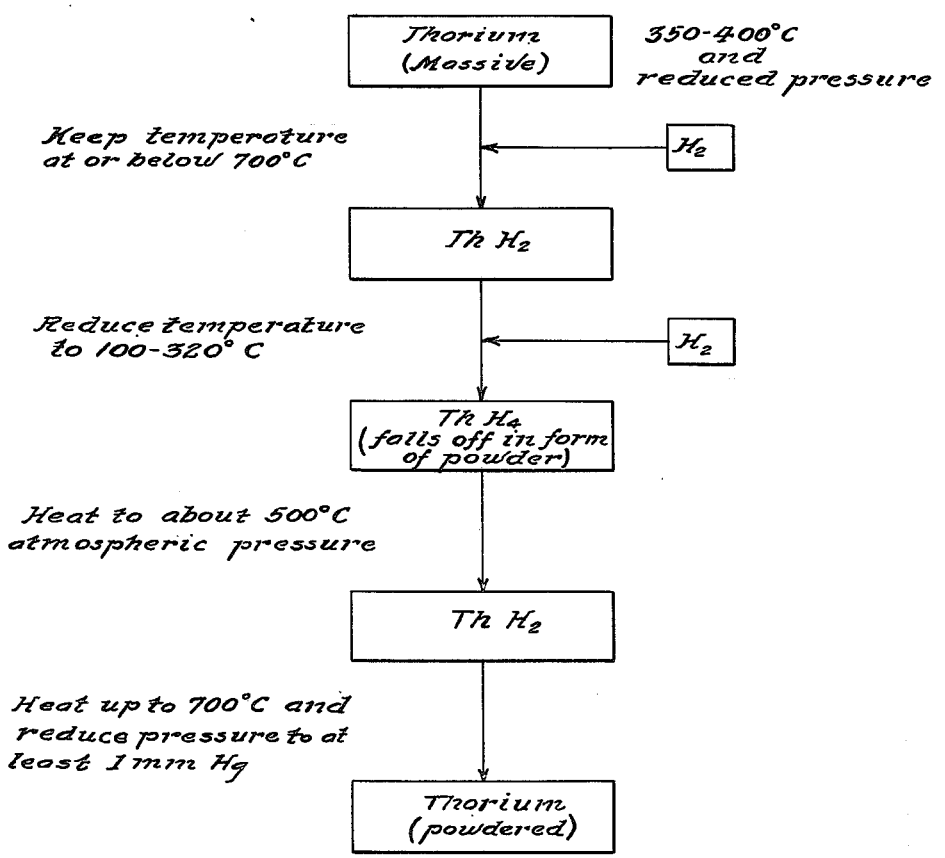
INVENTORS.
Harley A. Wilhelm.
Premo Chiotti.
BY
Roland A. Anderson
Attorney Patented Apr. 21, 1953

2,635,956

UNITED STATES PATENT OFFICE 2,635,956

PREPARATION OF POWDERED THORIUM

Harley A. Wilhelm and Premo Chiotti, Ames, Iowa, assignors to the United States of America as represented by the United States Atomic Energy Commission Application January 27, 1950, Serial No. 140,902

5 Claims. (Cl. 75—0.5)

This invention deals with the preparation of metal in powdered form and, in particular, with the preparation of powdered thorium.

Some metals, for instance uranium, have been converted into powdered form by reacting the massive metal with hydrogen and thereby forming the metal hydride, disintegrating the hydride, and thereafter decomposing the powdered metal hydride. This process is not operative in the case of thorium because at relatively high temperatures $ThH_2$ is obtained which can be powdered only with difficulties. When the temperature is raised still higher, thorium in massive form results.

It is an object of this invention to devise a process for preparing powdered thorium metal without the necessity of grinding, and in particular of grinding the metallic thorium.

It is another object of this invention to provide a process for preparing powdered thorium metal, the particle size of which may be reduced still further, if desired, by disintegrating it by mortar and pestle.

It is another object of this invention to provide a process for preparing powdered thorium metal which has a high degree of purity.

It is still another object of this invention to provide a process for converting thorium metal of technical grade into powdered thorium of a high degree of purity.

It is still another object of this invention to provide a process for preparing powdered thorium metal that does not involve any fire hazard.

These and other objects are accomplished by contacting massive metallic thorium at elevated temperatures with hydrogen gas so as to form $ThH_2$, cooling said thorium hydride to a lower, but still elevated, temperature while continuing the hydrogen supply whereby a higher thorium hydride, $ThH_x$ (where $x$ is greater than 3 and not more than 4), is formed in the form of a powder which falls off the massive thorium or $ThH_2$, thereafter discontinuing hydrogen supply and heating said higher thorium hydride to a more elevated temperature whereby it decomposes and forms thorium dihydride, and finally increasing the temperature and reducing the pressure whereby powdered metallic thorium is obtained. The higher thorium hydride formed in the process was found to have an average proportion of thorium to hydrogen corresponding to the formula $ThH_{3.75}$.

More particularly, the process is carried out by first hydriding the massive thorium at a temperature close to, but below, 700° C. and preferably with hydrogen having superatmospheric pressure; the formation of the higher hydride is suitably carried out at a temperature between room temperature and 320° C., but preferably between 100° and 320° C., and with hydrogen of atmospheric pressure. The optimal temperature for this step was found to be 250° C. Jarring of the reaction container is helpful in speeding up removal of the powder formed of $ThH_x$ from the massive thorium or $ThH_2$; however, this is not necessary, because the $ThH_x$ falls off automatically. The temperature most favorable for the decomposition of the higher hydride to $ThH_2$ is approximately 500° C.; the use of atmospheric pressure is satisfactory. Then, in order to decompose the thorium dihydride to powdered thorium metal, the pressure is reduced preferably to below 1 mm. Hg and the temperature increased to near, but not above, 700° C.

In carrying out the process of the invention, pieces of metallic thorium are enclosed in a container, for instance of stainless steel or fused silica, and the pressure in the container is reduced to about one micron. The container, and thus the thorium, are then heated to a temperature of from 350° to 400° C. After these preparatory steps, hydrogen is introduced for the first hydriding step; care has to be taken that the temperature does not exceed 700° C. which is liable to happen due to the exothermic character of the reaction. This temperature control may be effected by diluting the hydrogen with an inert gas, for instance with helium or argon, whenever reduction of the temperature becomes necessary.

As soon as the hydrogen consumption ceases, the formation of the $ThH_2$ is completed. The mass is then cooled to a temperature of at least 320° C. while the hydrogen supply is continued. At this lower temperature, which may be as low as room temperature, the formation of the higher hydride $ThH_x$ takes place. The $ThH_x$ is obtained in the form of a more or less coarse powder which, as has been mentioned before, falls off the metallic thorium pieces.

After this, the $ThH_x$ powder is decomposed. For this purpose, the temperature is increased to about 500° C., and the pressure is maintained at atmospheric level. When no more hydrogen gas is set free, the decomposition of $ThH_x$ to $ThH_2$ is completed.

In order to decompose the $ThH_2$ to metallic thorium, the temperature is then raised to near, but not over, 700° C., and the pressure in the container is reduced to below 1 mm. Hg. The metallic powdered thorium obtained is then cooled in an inert atmosphere, preferably of argon or helium. The grain size of the thorium powder is so that most of it will pass a 30 mesh screen.

In the attached drawing, a flow sheet is shown which diagrammatically illustrates the various steps of the process of this invention.

While thorium in the form of turnings or chips is best suitable for the process of this invention, blocks of thorium having a diameter of, for instance, 4 inches have been used successfully. The thorium pieces, in the case that a thorium powder of high degree of purity is desired, are advantageously surface-cleaned, for instance the blocks by means of a buffing wheel. Prior to the process proper, during the preheating step, it has been found advantageous to alternate between introducing hydrogen and evacuating the reaction container in order to sweep out all gases, such as oxygen, that might impair the purity of the final product.

While the pressure of the hydrogen is not critical for the first hydriding step, a pressure slightly above one atmosphere is preferred. After the formation of thorium dihydride has started, heating is mostly not necessary any longer, due to the exothermic character of the reaction, this in particular not if chips or turnings have been used as the starting material. In this first step, the temperature should not exceed 700° C., the preferred range being from 600° to 650° C. As has been set forth above, the admixture of argon or helium to the hydrogen is often advantageous in order to avoid excess temperatures. However, other means known to those skilled in the art may be used instead of the addition of inert gases, for instance the flow of hydrogen may be throttled or the reaction container may be cooled by outside means, for instance by a cooling medium introduced into coils provided therefor.

The change of pressure or its constancy, as the case may be, while hydrogen flow is discontinued, is an indication for the rate of conversion; thus, for instance, if, when the hydrogen flow is stopped, the pressure in the hermetically sealed reaction container remains constant, the reaction is completed, no further hydrogen being absorbed by the reaction mass.

During this first step of hydriding and the formation of $ThH_2$, the thorium metal swells and the degree of swelling is an indication whether the reaction proceeds satisfactorily.

As has been set forth above, the powdered thorium metal obtained in the final step, which is highly reactive, is preferably cooled in an atmosphere of helium or argon gas. When the container is opened, after cooling, it is advantageous to add a piece of dry ice in order to create an atmosphere of carbon dioxide.

Most of the thorium obtained is fine enough to pass a 30 mesh screen, and about 50% even will pass usually a 100 mesh screen. If a finer particle size is desired, the entire cycle of the process may be repeated. However, the thorium powder may also be easily ground to a finer grain size if the necessary precautions, such as inert atmosphere, are taken. It has also been found advantageous to introduce steel balls together with the thorium pieces into the reaction container and to shake or jar the container during or after the formation of $ThH_x$ which is during or after the second hydriding step in order to aid powdering.

It will be understood that if the hydrogen used is of a high degree of purity, a very pure thorium powder may be obtained and that thus by this method commercial thorium can be converted to thorium of a high degree of purity.

One apparatus, which was successfully used for carrying out the process of this invention, consisted of a reaction container, a furnace for heating the container, a pyrometer, mechanical and diffusion vacuum pumps, vacuum gauges and, optionally, means for purifying the hydrogen. The reaction container consisted of a seamless plain carbon steel tube of 26 in. length and 4⅜ in. inside diameter; this tube could hold 10 lbs. thorium in the form of shavings, there still being ample space left for the swelling of the charge during the hydride formation. The open end of the tube was water-cooled so that a rubber gasket used there to obtain hermetic closure was not overheated. For heating the container, a large cylindrical furnace, similar to an ordinary combustion furnace, was used.

In the following, a description is given, by way of example, of one embodiment of the process of this invention.

*Example*

Four pieces of thorium metal having a diameter of about 4 in. each and totalling 22.29 lbs. were surface-cleaned by means of a buffing wheel. These four pieces were then enclosed in a steel container which had a glass window to make observation of the process possible. The reaction container was then hermetically sealed with a lid having a connection with a vacuum pump and one with a hydrogen source. The pressure in the container was then reduced to about 0.5 micron and the temperature thereafter increased to about 355° C. When this temperature was reached, hydrogen having a pressure of 6 cm. Hg above atmospheric pressure was introduced; the reaction started immediately, though slowly. A change in the appearance of the metal could be noted; the color became darker and blisters formed on the surface. As the temperature increased, the reaction became more vigorous and the blisters larger and more numerous. A drop in the pressure was also noted; this was obviously due to the high speed of the reaction and thus the high consumption of hydrogen. As soon as the temperature reached 700° C., the furnace was turned off and the hydrogen supply was continued and introduced with a pressure of 80 cm. Hg. Although the reaction slowed down somewhat after about one and one-half hours, hydrogen supply at this temperature near 700° C. was continued for another three and one-half hours. At that time, formation of $ThH_2$ was complete as could be seen from the constancy of the pressure in the reaction container when the hydrogen supply was discontinued.

The reaction container was then cooled to an average temperature of about 278° C.; the hydrogen supply was continued for about twenty-seven hours after which the reaction came to a standstill; this was when all of the $ThH_2$ had been converted to the higher hydride $ThH_x$.

Then the hydrogen supply was shut off and the temperature again increased up to 501° C. within two hours. During this time, decomposition of the higher hydride to $ThH_2$ took place and the pressure increased noticeably due to the development of hydrogen. Thereafter, which means after there was no more hydrogen development, the temperature was still furthermore increased up to about 600° C.; however, this higher temperature did not bring forth any further hydrogen development. This indicated that all of the higher hydride had been converted to ThH₂.

Thereafter, the temperature was brought to an average of about 650° C., avoiding temperatures higher than 700° C., and the container was evacuated at the same time. A new decomposition reaction accompanied by development of hydrogen set in, and the temperature dropped. This evacuation step was maintained for approximately ten hours after which no further development of hydrogen could be noticed. The ThH₂ had been completely converted to metallic thorium.

The heat was then turned off, and the entire system was filled with argon of a pressure slightly above one atmosphere. Thereafter, the container was opened and pieces of Dry Ice were immediately dropped into the tube; the container was also packed in Dry Ice in order to accelerate cooling to at least room temperature.

It was found that approximately 17 lbs. of the 22.29 lbs. of thorium originally introduced into the container had been converted into powder, most of which passed a 30 mesh screen.

It will be understood that while there have been described herein certain specific embodiments of the invention, it is not intended thereby to have the invention limited to the details given, since the invention is susceptible to various modifications and changes which come within the spirit of the disclosure and the scope of the appended claims.

What is claimed is:

1. A process for preparing powdered thorium, comprising treating massive metallic thorium at 600° to 650° C. with hydrogen of slightly superatmospheric pressure whereby all of the thorium is converted to ThH₂; lowering the temperature to 320° to 100° C. while continuing to introduce hydrogen at atmospheric pressure whereby ThH$_x$ is formed from all the ThH₂ present and falls off in the form of a powder, $x$ representing a value higher than 3 but having a maximum of 4; discontinuing hydrogen supply, increasing the temperature and reducing the pressure whereby powdered metallic thorium is obtained.

2. A process for preparing powdered thorium, comprising treating metallic thorium at 600° to 650° C. with hydrogen of slightly superatmospheric pressure whereby all of the thorium is converted to ThH₂; lowering the temperature to from 320° to 100° C. while continuing to introduce hydrogen at atmospheric pressure whereby ThH$_x$ is formed from all the ThH₂ present and falls off in the form of a powder, $x$ representing a value higher than 3 but having a maximum of 4; increasing the temperature to about 500° C. and discontinuing hydrogen supply whereby decomposition of said higher hydride to ThH₂ takes place; and finally decomposing said ThH₂ by still further increasing the temperature to about 700° C. and reducing the pressure below atmospheric pressure whereby powdered metallic thorium is obtained.

3. A process for preparing powdered thorium, comprising treating metallic thorium at 600° to 650° C. with hydrogen of slightly superatmospheric pressure whereby all of the thorium is converted to ThH₂; lowering the temperature to about 250° C. while continuing to introduce hydrogen at atmospheric pressure whereby ThH$_x$ is formed from all the ThH₂ present and falls off in the form of a powder, $x$ representing a value higher than 3 but having a maximum of 4; increasing the temperature to about 500° C. and discontinuing hydrogen supply whereby decomposition of said higher hydride to ThH₂ takes place; and finally decomposing said ThH₂ by still further increasing the temperature to about 700° C. and reducing the pressure below 1 mm. mercury whereby powdered metallic thorium is obtained.

4. A process for preparing powdered thorium, comprising treating metallic thorium at 600° to 650° C. with a mixture of an inert gas and hydrogen of slightly superatmospheric pressure whereby all of the thorium is converted to ThH₂; lowering the temperature to from 320° to 100° C. while continuing to introduce hydrogen at atmospheric pressure whereby ThH$_x$ is formed from all the ThH₂ present and falls off in the form of a powder, $x$ representing a value higher than 3 but having a maximum of 4; increasing the temperature to about 500° C. and discontinuing hydrogen supply whereby decomposition of said higher hydride to ThH₂ takes place; and finally decomposing said ThH₂ by still further increasing the temperature to about 700° C. and reducing the pressure below atmospheric pressure whereby powdered metallic thorium is obtained.

5. A process for preparing powdered thorium, comprising treating metallic thorium at a temperature of from 600° to 650° C. with hydrogen of slightly superatmospheric pressure whereby all of the thorium is converted to ThH₂; lowering the temperature to from 320° to 100° C. while continuing to introduce hydrogen at atmospheric pressure and jarring the reaction mass whereby ThH$_x$ is formed from all the ThH₂ present and flaked off in the form of a powder, $x$ representing a value higher than 3 but having a maximum of 4; increasing the temperature to about 500° C. and discontinuing hydrogen supply whereby decomposition of said higher hydride to ThH₂ takes place; decomposing said ThH₂ by still further increasing the temperature to about 700° C. and reducing the pressure below atmospheric pressure whereby metallic thorium is obtained in the form of powder; and cooling said metallic thorium in an inert atmosphere.

HARLEY A. WILHELM.
PREMO CHIOTTI.

References Cited in the file of this patent

UNITED STATES PATENTS

| Number | Name | Date |
|---|---|---|
| 1,699,393 | Hagens et al. | Jan. 15, 1929 |
| 1,835,024 | Driggs | Dec. 8, 1931 |
| 2,107,277 | Austin | Feb. 8, 1938 |